June 28, 1960

M. BIALER 2,943,291

VACUUM TUBE SOCKET

Filed Sept. 13, 1955

INVENTOR.
MAX BIALER
BY
ATTORNEYS

United States Patent Office 2,943,291
Patented June 28, 1960

2,943,291

VACUUM TUBE SOCKET

Max Bialer, Dayton, Ohio, assignor to the United States of America as represented by the Secretary of the Air Force Filed Sept. 13, 1955, Ser. No. 534,179

3 Claims. (Cl. 339—75)

(Granted under Title 35, U.S. Code (1952), sec. 266)

The invention described herein may be manufactured and used by or for the United States Government for governmental purposes without the payment to me of any royalty thereon.

This invention relates to electronic equipment receptacles and more particularly to a center of gravity vacuum tube socket locating the center of gravity of a vacuum tube approximately within the plane of the chassis within which the tube socket is mounted for minimizing whipping moments during displacements, severe vibrations and the like, to which the assembly may be subjected. The invention is applicable particularly to military electronic equipment such as heavy vacuum tubes and the like which are subjected to abrupt and violent abuse.

As a background for insuring a sufficient understanding of the present invention as claimed, in the field of electronic equipment extensive work has been done in standardizing and in ruggedizing military electronic equipment. In this work the severity and the abruptness of forces to which vacuum tube assemblies are subjected in actual military service may whip the tubes out of their sockets.

A general statement of the present invention summarizing the nature and the substance thereof and commensurate with the invention as claimed and coextensive therewith, is that the nature of the present invention is to provide a secure mount and hence a prolonged service life for ruggedized military electronic equipment in the form of strong support both laterally and longitudinally of pieces of equipment with the center of gravity thereof positioned even with the chassis and with the positive retention of the equipment such as a vacuum tube or the like within its socket. The substance of the present invention illustratively is a center of gravity vacuum tube socket positioning the tube center of gravity even with the chassis, with half of the tube weight above and half of the tube weight below the chassis and with or without, as preferred, a longitudinally acting tube retaining means.

A general object of the present invention, as claimed, is the provision of a new and an improved vacuum tube socket which positions the tube center of gravity substantially in the plane of its mount and thereby in the presence of severe vibration and shock, prevents the tube from being displaced from its socket to thereby prolong the service like of the tube, prevent excessive moments from causing the displacement of the tube from its mount during severe horizontal vibrations and, together with the modification disclosed herein, arrests tube displacement during severe vibrations in direction both within and up to normal to the plane of the chassis within which the tube socket is mounted.

An illustrative embodiment of the present invention is shown in the accompanying drawings wherein:

Fig. 1 is a side elevational view of a tube socket which embodies the present invention secured within an aperture in a chassis by means of bolts or the like;

Figure 3:
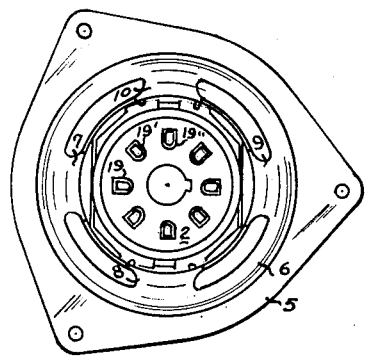
Fig. 3 is a plan view from above of the socket in Fig. 1.

The electronic equipment receptacle shown in the accompanying drawings adapted for use with one of the heavier types of vacuum tubes, such as the 5R4WGY tube, comprises a sheet metal stamping 1 carrying in its lower end a tube pin contact supporting and insulating ceramic base 2. The vacuum tube socket is adapted for being mounted within an aperture in a chassis 3 by means of bolts 4, 4' or the like, such that the center of gravity of the tube within its socket is substantially within the plane of the chassis 3. The chassis 3 commonly is made of flat sheet metal. The term vacuum tube is used in its usual sense as consisting of a hollow evacuated or gas filled envelope attached downwardly to an insulating tube base with a peripheral collar and from which tube base contact pins or tube electrical contacts project axially.

The vacuum tube socket sheet metal stamping 1 comprises a radially outwardly projecting top flange 5 overlapping the chassis 3 sufficiently for the registration of bolt shaft occupied holes in both. The tube socket stamping 1 further comprises a saddle ring 6, a desired plurality of ribs 7, 8, 9 and 10, a circular ring 11, a tube pin socket base securing ring 12 and a pair of radially inwardly extending bottom flange arcs 13 and 14. The sheet metal stamping 1 securely carries at its unattached lower end the tube pin contact supporting insulating base 2.

The base 2 has flat lateral sides which engage the inner surfaces of socket flat land portions 15 and 16 of the securing ring 12 so that the base 2 is nonrotatably positioned therebetween. The base 2 is flanged suitably for its being secured positively against axial displacement by having base lateral flanges positioned between the socket lowermost flange arcs 13 and 14 and two pairs of indentations 17 and 18 on diametrically opposite sides of the securing ring 12. The base 2 houses a plurality of tube pin receiving socket contacts 19, 19', 19", etc. which continue as socket contact blade portions 20, 20', 20", etc. projecting downwardly from the ceramic part of the base 2. The socket contact blade portions are indented in the usual manner to secure them to the ceramic part of the base 2. The exposed ends of the contact blades 20, 20', 20", etc. provide exposed terminals in the usual manner and preferably are apertured to receive and to have soldered thereto separate contact wires.

The tube 5R4WGY is an illustratively ruggedized vacuum tube used by the Armed Forces and for which the present tube mount is particularly adapted. The 5R4WGY tube has an insulating collar 28 rising from its base and terminating upwardly in a land projecting radially outwardly of its glass envelope.

Figure 5:
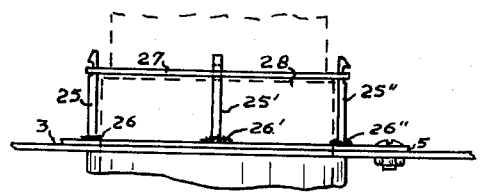
Fig. 5 is a fragmentary side elevational view of the tube mount shown in Fig. 1 with the addition of a spring clamp and a ring modification positively restraining the tube within its mount in the presence of severe displacement longitudinally of the tube and socket.
Figure 2:
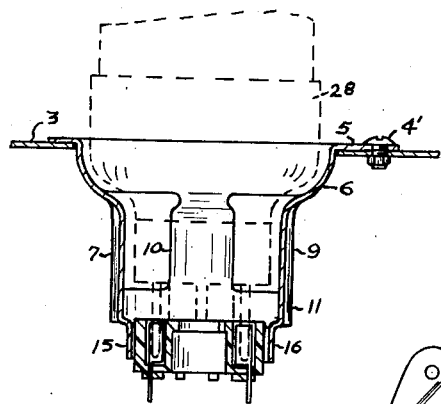
Fig. 2 is an axial section of the tube socket shown in Fig. 1, with dash lines indicating a vacuum tube fragment mounted within the tube socket.
Figure 1:
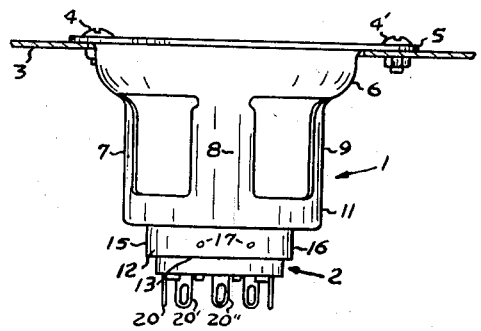
Figure 4:
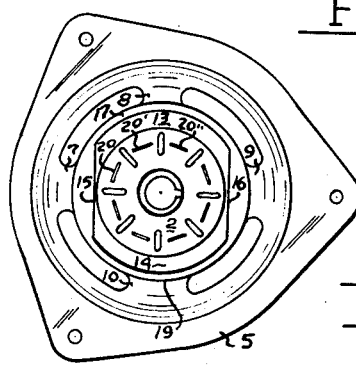
Fig. 4 is a plan view from below of the socket in Fig. 1.

In Fig. 5 of the accompanying drawing is shown a modification of the present invention adapted for the retention of the ruggedized vacuum tube type of equipment within its mount in the presence of axially directed displacement forces.

In Fig. 5 a desired plurality of spring members 25, 25', 25", etc. have attached ends secured by welding 26, 26', 26", etc., respectively, or the like, to the upper surface of the socket top flange 5, about at its junction with the saddle ring 6. The springs 25, 25', etc. illustratively may receive and may retain a ring 27 adjacent their upper ends at and for which they may be suitably notched. The ring 27 positively engages to retain the upper land of the tube collar 28 and thereby positively and axially restrains the tube from leaving its socket.

In an illustrative model the upper ends of the springs 25, 25', etc. were notched in their radially outer edges adjacent their upper unattached ends and the ring 27 was apertured to slip down over the unattached spring ends to be engaged by the spring notches, to be retained thereby against the tube collar 28 axial upper land, and to be in positive engagement therewith whenever vertically directed displacement vibrations or the like tended to lift the tube out of its socket. It will be apparent that the springs 25, 25', etc. which otherwise engage the tube ring land, as by having the spring upper ends bent radially inwardly there against or the like, and the ring 27 omitted, within the concept of the present invention.

It is to be understood that the socket and its associated parts which are disclosed herein have been submitted for the purposes of illustrating and describing an operative embodiment of the present invention and that equivalent adaptations may be made without departing from the scope of the present invention.

I claim:

1. A receptacle for a vacuum tube base comprising a depressed socket made of a metal stamping shaped to provide a securing flange overlying the edge of a vacuum tube base receiving aperture in a chassis, a socket saddle ring structurally continuously integral with the securing flange of the socket as a part thereof and designed for positively supporting the vacuum tube by physical engagement with a side of the base thereof, a plurality of ribs that are structurally continuously integral with the securing flange and the socket saddle ring and extending axially of the socket metal stamping for the purpose of extending the mechanical structure continuously and integrally below the socket saddle ring structure, a circular ring portion of the vacuum tube base receiving metal stamping depressed socket that is structurally continuously integral with the saddle ring through the ribs for the purpose of providing a continuously firm and rugged mount for the base of the vacuum tube, and a base retained mechanically by the socket at the end of the metal stamping that is remote from its securing flange portion and being made of an electrically insulating material that contains a plurality of axially extending apertures and which material has an adequately high dielectric characteristic to prevent electrical conductivity through the base material at the electrical potentials with which the socket is used, and a plurality of tube pin engageable contacts mounted in the socket base apertures.

2. The vacuum tube base socket defined in the above claim 1 and receiving a vacuum tube consisting of an envelope with a tube collar as part of the vacuum tube and the tube collar having a radially outwardly extending base land portion at the junction of the tube collar and the tube envelope, and tube base land portion engaging means, retaining means welded to the base socket for arresting axial separation of the tube from the tube base socket.

3. A depressed socket for a vacuum tube base and the vacuum tube consisting of an envelope and a base with the tube base having an upper land portion that extends laterally away from the tube base junction with the tube envelope and the vacuum tube having a three-dimensional mass that for the purpose of stress distribution may be regarded as being concentrated at a point that is spacially inside of the base of the vacuum tube and that is referred to as the center of gravity of the tube and that is within a flat plane that is normal to the axis of the vacuum tube inclusive of both its envelope and its base and the vacuum tube base including a plurality of tube electrical contact pins that project axially from the end of the tube base that is structurally remote from the junction of the tube base with the tube envelope, the depressed socket comprising a sheet metal stamping that is flared radially outwardly in a top flange portion that is sufficiently flat to be in a flat plane in which flat plane the center of gravity of the vacuum tube will be located when the vacuum tube is mounted in the depressed socket, a saddle ring portion of the sheet metal stamping that is structurally continuously integral with the sheet metal stamping and with the top flange portion thereof and which saddle ring portion of the sheet metal stamping provides a saddle-like seat against which the vacuum tube base rests axially of the assembly of the vacuum tube base in the depressed socket, a retaining ring overlying the tube base upper land portion for limiting the axial displacement of the vacuum tube, an electrically nonconducting socket base engaging the vacuum tube base remote from the tube base land portion engaged by the retaining ring, and a spring means attached to the socket and releasably engaging the retaining ring for axially restraining the displacement of the vacuum tube from its socket through the tube base and the socket base being apertured for the reception of the vacuum tube pins.

References Cited in the file of this patent

UNITED STATES PATENTS

| | | |
|---|---|---|
| 1,416,948 | Donahoe | May 23, 1922 |
| 1,763,796 | MacDonald | June 17, 1930 |
| 1,817,355 | Elliott | Aug. 4, 1931 |
| 2,392,410 | Reinschmidt | Jan. 8, 1946 |
| 2,474,976 | Harrison | July 5, 1949 |
| 2,543,740 | Ridgely | Feb. 27, 1951 |
| 2,717,366 | Summerer | Sept. 6, 1955 |
| 2,761,111 | Klostermann | Aug. 28, 1956 |